(12) United States Patent
Gonzalez et al.

(10) Patent No.: US 9,300,542 B2
(45) Date of Patent: *Mar. 29, 2016

(54) METHOD AND SYSTEM FOR USER BASED NETWORK ANALYSIS AND PLANNING

(71) Applicant: T-Mobile USA, Inc., Bellevue, WA (US)

(72) Inventors: Jason Gonzalez, Bothell, WA (US); Aslam Khan, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/268,312

(22) Filed: May 2, 2014

(65) Prior Publication Data

US 2014/0355479 A1    Dec. 4, 2014

Related U.S. Application Data

(63) Continuation of application No. 12/143,740, filed on Jun. 20, 2008, now Pat. No. 8,717,913.

(51) Int. Cl.
*H04W 24/00* (2009.01)
*H04L 12/24* (2006.01)
*H04L 29/08* (2006.01)
*H04W 24/10* (2009.01)

(52) U.S. Cl.
CPC ............ *H04L 41/12* (2013.01); *H04L 41/0806* (2013.01); *H04L 67/322* (2013.01); *H04W 24/00* (2013.01); *H04W 24/10* (2013.01)

(58) Field of Classification Search
CPC .............................. H04W 64/02; H04W 64/00
USPC .......................................... 370/252; 455/423
See application file for complete search history.

(56) References Cited

U.S. PATENT DOCUMENTS

| | | | |
|---|---|---|---|
| 7,580,716 B2 * | 8/2009 | Ransom et al. | 455/453 |
| 2002/0099841 A1 * | 7/2002 | Cerami et al. | 709/231 |
| 2004/0014491 A1 * | 1/2004 | Weigand | 455/552.1 |
| 2008/0092122 A1 * | 4/2008 | Caprihan et al. | 717/127 |
| 2009/0163223 A1 | 6/2009 | Casey | |
| 2010/0071061 A1 | 3/2010 | Crovella et al. | |
| 2011/0149782 A1 | 6/2011 | Townley et al. | |

* cited by examiner

*Primary Examiner* — Mark Rinehart
*Assistant Examiner* — Matthew Hopkins
(74) *Attorney, Agent, or Firm* — Kenyon & Kenyon LLP

(57) ABSTRACT

A system and method are provided for converting individual technical metrics into a single relevant metric understood and accepted by both technical and non-technical components of a business venture. An example system and/or method includes measuring current technical utilizations and capacities, translating those into a supportable users metric, forecasting future utilization levels, translating those into future network component and/or hardware requirements, and expanding/scaling technical capacity based on those values and the predetermined capacity levels of additional components and/or hardware.

14 Claims, 4 Drawing Sheets

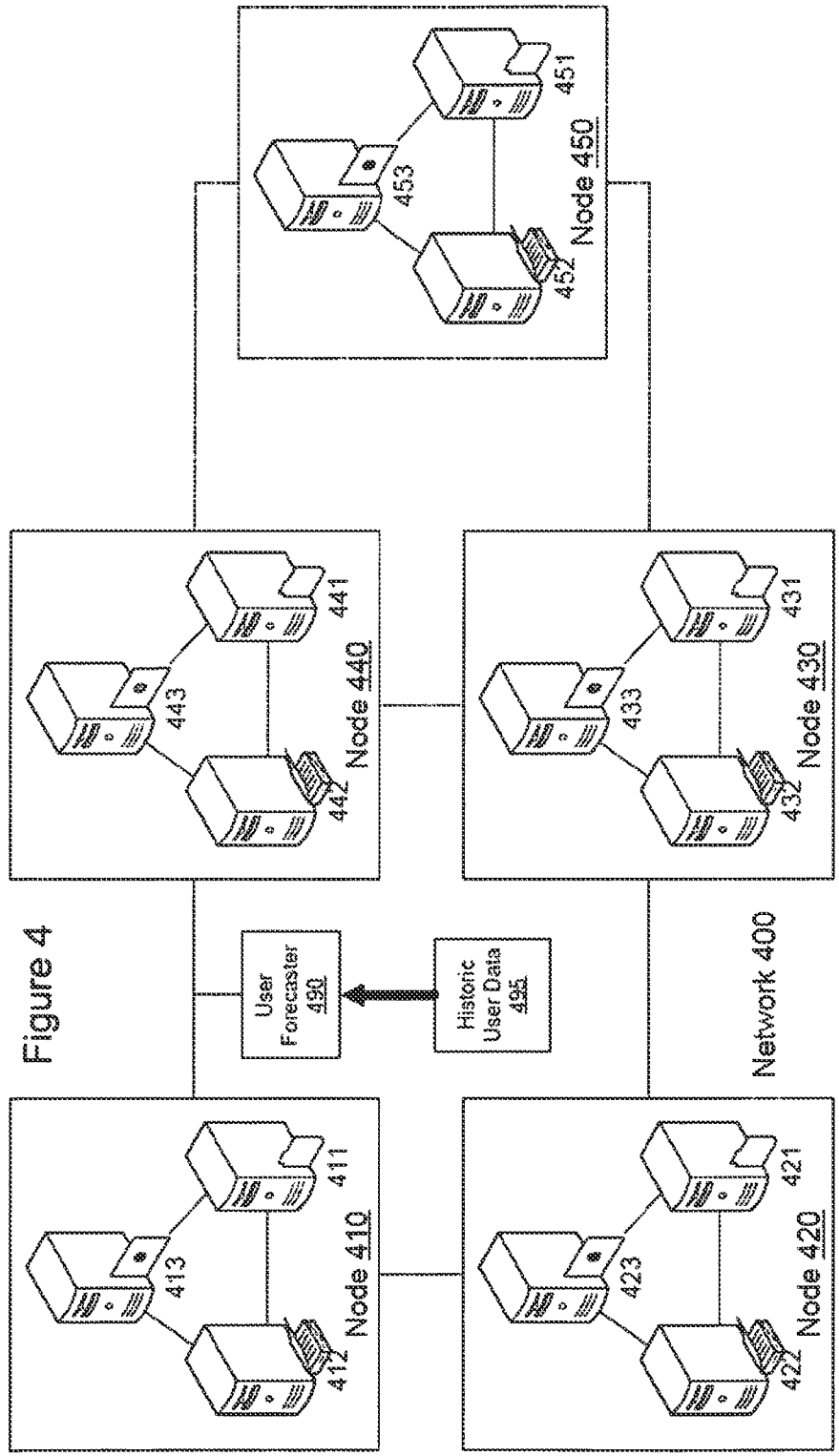

_METHOD AND SYSTEM FOR USER BASED NETWORK ANALYSIS AND PLANNING_

CROSS-REFERENCE TO RELATED APPLICATIONS

The present application is a continuation of and claims priority to U.S. patent application Ser. No. 12/143,740, filed on Jun. 20, 2008, entitled "Method and System for User Based Network Analysis and Planning," which, including all disclosures and specifications, is hereby expressly incorporated herein in their entireties by reference thereto.

BACKGROUND

Many service providers, such as wireless telecommunications carriers, VoIP (Voice over Internet Protocol) carriers, long distance carriers, LECs (local exchange carriers), cable television providers, satellite television and/or radio providers, etc., all share common needs to analyze network capacity and plan for network evolution based, in part, on user or subscriber usage and growth. For instance, wireless telecommunications carriers and satellite telecommunications carriers are experiencing substantial user growth, and therefore need to implement reliable and efficient analytical methodologies to anticipate and plan for network evolution. Because networks are composed of multiple nodes with various functionalities, all of which impact user experience, service providers need to analyze such network nodes to ensure that each node has capacity to meet evolving user use and growth. Thus, there exists a need for a robust, reliable, efficient analytical method and system to analyze node capacities in order to inform network planning and evolution.

SUMMARY OF THE INVENTION

Embodiments of the present invention involve a user based dimensioning analysis involving calculation of network node capacity in terms of a "supportable users" metric. For example, a method measures current utilization levels for one or a plurality of network nodes against then-current number of users utilizing a service involving the node(s), and calculating a maximum number of supportable users of such node(s). The method forecasts or predicts at least one future supportable users level that can be sustained by the network. The method expands the network resource based at least in part on the ratio of the future user forecast and the current maximum supportable user capacity.

In an embodiment, a method of supportable user based dimensioning involves measuring a current user level and measuring respective current utilization levels for a plurality of constraints. The plurality of constraints represent a network resource service. In a further embodiment, the method involves determining respective maximum utilization levels for the plurality of constraints. A calculation of a current maximum supportable users capacity is conducted based at least in part on the current user level, the current utilization levels of the plurality of constraints, and/or the maximum utilization levels of the plurality of constraints.

In an embodiment, the current utilization levels include memory utilization, signaling links capacity utilization, processor utilization, transactions per second and/or any other constraint.

In an embodiment, the signaling link utilization may employ the SS7 (Signaling System #7), SIGTRAN (Signaling Transport), SCTP (Stream Control Transmission Protocol), IP (Internet Protocol), or other protocols.

In an embodiment, the user is a wireless communication customer, and the network resource service is a wireless communication service provider.

In an embodiment, expanding the network resource includes adding sets of hardware, where each set has a user capacity, or a number of supportable users, associated with it representing an amount of maximum supportable users that are expected to increase after the set has been added to the network resource, and where the set configuration and associated number of supportable users is predetermined.

In an embodiment of the present invention, a system and method of user based dimensioning is provided. An embodiment includes a plurality of components organized in a network of nodes, where the plurality is configured to provide a network resource service. An embodiment includes a current supportable users level, and each component of the embodiment may include a current utilization level. An embodiment allows for a current maximum user capacity based at least in part on the current supportable users level and the current utilization levels of the plurality of components. An embodiment is configured to expand based at least in part on a ratio of a future user forecast and the current maximum user capacity. These embodiments can be used in various combinations with and/or without each other.

In an embodiment, current utilization levels include, but are not necessary limited to, memory utilization, signaling links capacity utilization, and/or processor utilization.

In an embodiment, signaling link utilization may involve the SS7, SIGTRAN, SCTP, IP, or other protocols.

In an embodiment, the user is a wireless communication customer, and the network resource service is one or more wireless communication service providers.

In an embodiment, the expandable network resource may include being configured to add sets of hardware, where each set has supportable users associated with it representing an amount the maximum supportable users are expected to increase after the set has been added to the network resource, and where the set configuration and associated number of users is predetermined.

An example system of user based dimensioning includes a network resource service or the like. The network resource service having a plurality of constraints and/or components. In the system, a measurement of a current user level is taken. And, a measurement of a respective current utilization level for each constraint and/or component of the plurality of constraints is taken. In the system, a determination of a respective maximum utilization level for each constraint and/or component of the plurality of constraints is made. In the system, a current maximum supportable users capacity is based on the current user level, the respective current utilization levels of each constraint and/or component of the plurality of constraints and/or component, and the respective maximum utilization levels of each constraint and/or component of the plurality of constraints and/or components.

An example embodiment of the present invention provides a computer-readable storage medium encoded with instructions configured to be executed by a processor, the instructions which, when executed by the processor, cause the performance of one or more of the example methods described herein. An example method calculates a current user level. An example method measures the current utilization levels for a plurality of components and/or constraints, where the plurality of components and/or constraints represent a network resource service. An example method calculates current maximum supportable users, based at least in part on the current user level, the current utilization levels of the plurality of components and/or constraints, and/or maximum capacity of the components. An example method forecasts and/or predicts at least one future supportable users level. An example method expands the network resource based at least in part on the ratio of the future user forecast and the current maximum supportable users capacity for multiple constraints and/or components. These methods described may be used in combination with and/or without each other.

BRIEF DESCRIPTION OF THE DRAWINGS

FIG. 4 illustrates an example network system according to an example embodiment of the present invention.

DETAILED DESCRIPTION

Figure 1:
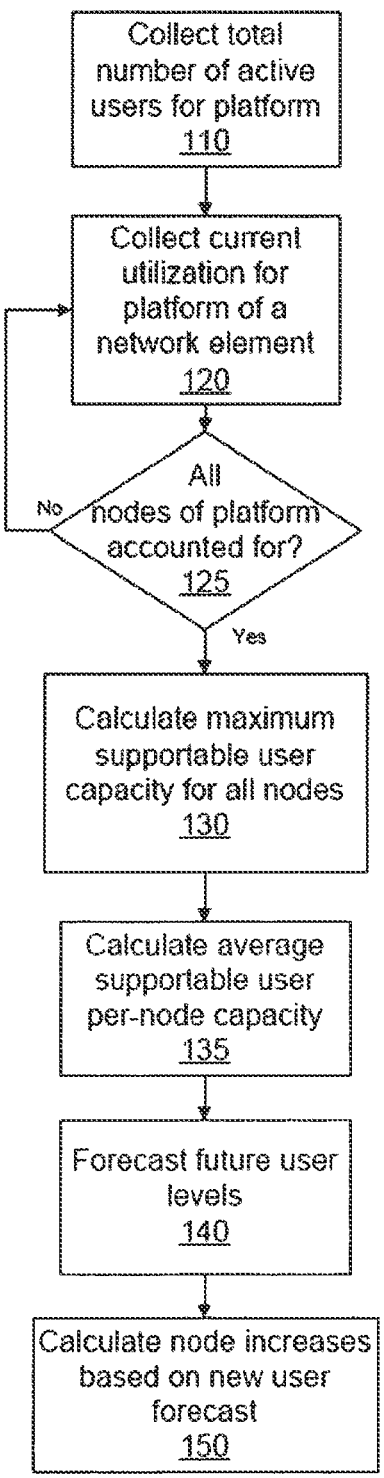
FIG. 1 illustrates an example method according to an example embodiment of the present invention.

Services companies (e.g., a cellular communications company, a VoIP carrier, a long distance carrier, an LEC, a cable television provider, a satellite television provider, a satellite radio provider) generally are composed of two broad groups with considerable operational overlap and/or interaction. For example, one group may deal primarily with non-technical business issues, such as sales, accounting, marketing, management, business development, and other nontechnical functions. The other group may deal with technical issues and be responsible for planning, purchasing, installing, maintaining, engineering, administering, and upgrading the technical infrastructure required to provide the services being provided by the company to its customers. There are, of course, some groups with overlap between these two general areas. For example, a product development group or an engineering group may include technical people tasked to address technical issues pertaining to the company's network operations, as well as nontechnical people tasked to address, for instance, financial planning involving the network. Unfortunately, each group will approach common or shared issues with analytical tools unique to their disciplines, thereby creating inefficiencies based on incompatible analytical methodologies. For reasons of simplicity, monetary and analytical efficiency, and clarity across such groups and the corporate structure as a whole, a company may find it beneficial to implement a unified analytical method incorporating a single metric for use in analyzing network planning. Example embodiments of the present invention include systems and methods for unifying the great variety of technical metrics under one metric that can be easily understood by various groups across the company.

The following description provides specific details for a thorough understanding of, and enabling description for, various embodiments of the method and system. One skilled in the art will understand that the method(s) and system(s) may be practiced without many of these details. In some instances, well-known structures and functions have not been shown or described in detail to avoid unnecessarily obscuring the description of the embodiments of the method and system. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section.

Some of the example embodiments use a cellular telecommunications company to illustrate some benefits and details of the present invention. It will be appreciated that the present invention may be practiced in connection with any network operation, and is not limited to cellular telecommunications networks. A single user metric is believed to be a useful, and to-be, universally acceptable analytical metric because most, if not all, groups within a company must factor user experience in planning. A sales department, for instance, may use a user metric to forecast and/or quantify revenue growth or customer turnover. A business development department may ration capital, seek new partnerships, and/or explore new business lines, all based in terms of users. A marketing department and a product development department may use user demographic data to analyze prospective services, when such services should be launched, and upon whom such services should focus. Though variations and additional details may be included, the central metric used by the business oriented departments may likely be the total number of users.

For the more technical departments, forecasts, projections and network dimensioning can be based on more technical metrics. Such technical metrics may, in a cellular telecommunications network, traditionally include busy hour call attempts (BHCA), transactions per second (TPS), messages per second (MPS), megabytes used (e.g., memory requirements), octets transmitted/received (e.g., signaling requirements), percent CPU (central processing unit) utilization, and many other metrics. Further, each network service (e.g., voice service, data service, multimedia service, etc.) or network node (e.g., call switching, network maintenance/monitoring, voicemail, etc.) may traditionally involve totally or partially different metrics in terms of the hardware and software required to facilitate the specific service or element. While these various traditional technical metrics can be highly relevant to overall system performance and capacity, they are generally only to those who are trained in a corresponding discipline, and likely will not be immediately understandable to those people on the business side of the company who are trained in other disciplines. Thus, some embodiments of the present invention provide systems and/or methods for capturing the various technical metrics into the single metric of supportable users.

A network may include many different platforms with multiple nodes, but each platform may share at least the following three elements: memory usage, CPU usage, and signaling link usage. Formulas, based on these and/or other performance constraints and/or relationships are created to express everything in terms of supportable users. Example embodiments determine, for example, the number of bytes of memory used by a user, the percentage of CPU throughput used by a user, and the number of messages (e.g., generated SS7 signals) per user. In a further embodiment, this data then in turn is applied to various network node configurations, which depends on component selection (e.g., server A vs. server B), component aggregation (e.g., two A servers and a B server vs. three A servers), and positioning of network nodes (e.g., the network topology). As a result of this application, each element, node, or package of elements may be expressed in the single metric of supportable users.

An example of a network component in a GSM (Global System for Mobile communications) cellular telecommunications network, is a home location registrar/authentication center (HLR/AUC). An HLR/AUC may be responsible for maintaining a list of the home location and/or current location of wireless telecommunication handsets (i.e., users) on the network. In a further embodiment, the HLR/AUC is responsible for ensuring each user attempting to use network resources is authorized. FIG. 1 illustrates how this node (HLR/AUC) can be analyzed and utilized in the context of an embodiment of the present invention. At 110, the example method collects the total number of active users currently associated with a specific platform (e.g., 30,000). At 120, the example method collects the current utilization (e.g., 50%) for the platform of a network element, or the relevant network platform, (e.g., memory usage). At 125, the method then returns to collect the current usage for any other constraint that makes up the platform. For example, the method may collect data showing that there are currently 30,000 users utilizing a platform, memory is 50% utilized, CPU is 25% utilized, and signaling links (e.g., SS7) are 48% utilized. At 130, the maximum supportable users metric is calculated (e.g., 60,000). At 60,000 users, the memory utilization may cap out at 100%. Therefore, regarding the constraints of this network element, the network has a supportable users metric of 60,000. However, that does not necessarily imply that only the highest percent utilization of the several parts is the only relevant number. At 60,000 users, the CPU may be at 50% utilization and signaling may be at 96% utilization. These utilization numbers are, however, only for the one HLR/AUC feature. The HLR/AUC can be coupled with other elements that are very CPU intensive but do not use much memory or signaling capacity.

Further calculations may be needed for adequate user forecasting and network growth. At 135, the example method calculates a per node average supportable users metric. For example, 30,000 users may cause the network memory to have a 50% utilization, and there may currently be 30 nodes in the network. A node may be, for example, a kind of server with a specific configuration or a set of servers with a specific configuration. Thus, there may be several different kinds of nodes, and each kind or type of node may need to have a per node supportable users capacity calculated to achieve the most advantageous and/or efficient results. Assuming all 30 nodes are the same, and the network had a 60,000 supportable users capacity, then each node may have a 2,000 average supportable users capacity according to the example embodiment. At 140, the example method forecasts future user levels (for instance, a sales forecast). In a further or alternative embodiment, the example method imports the forecast from another source. Then at 150, the example method calculates what node increases will be required to accommodate the growing user forecast.

As the example method of FIG. 1 illustrates, all network dimensioning (e.g., planning) can be expressed, according to the present invention, in terms of forecasted user levels and maximum supportable users capacity based on a most limiting constraint. As new equipment is used and/or new equipment configurations adopted, the underlying formulas can be adjusted or expanded, and after those adjustments are made, all dimensioning can be expressed in terms of supportable users. This allows for faster, clearer, and far more agile network analysis and planning. Repackaging the capacity metrics into individual node's supportable users capacity and overall network supportable users capacity not only clarifies and streamlines signaling (e.g., SS7), memory, license, and CPU requirements, but physical requirements can be made more clear and more efficient, such as number of racks or shelves, amperage or power consumption, and square meters or floor space. Once the central metric has been established, the business units may propose changes designed to increase users by a certain number. In previous systems/methods, the technical units would have to go through a complicated, time-consuming, and expensive nonautomated review of utilization levels and technical capacity to determine hardware increases necessary to handle the increase. In embodiments of the present invention, network utilization can be expressed in terms of supportable users, and network nodes can be organized under predetermined amounts of additional supportable users. Further, the embodiments of the present invention can be automated. This can allow for extremely agile network planning, understood across company departments.

Figure 2:
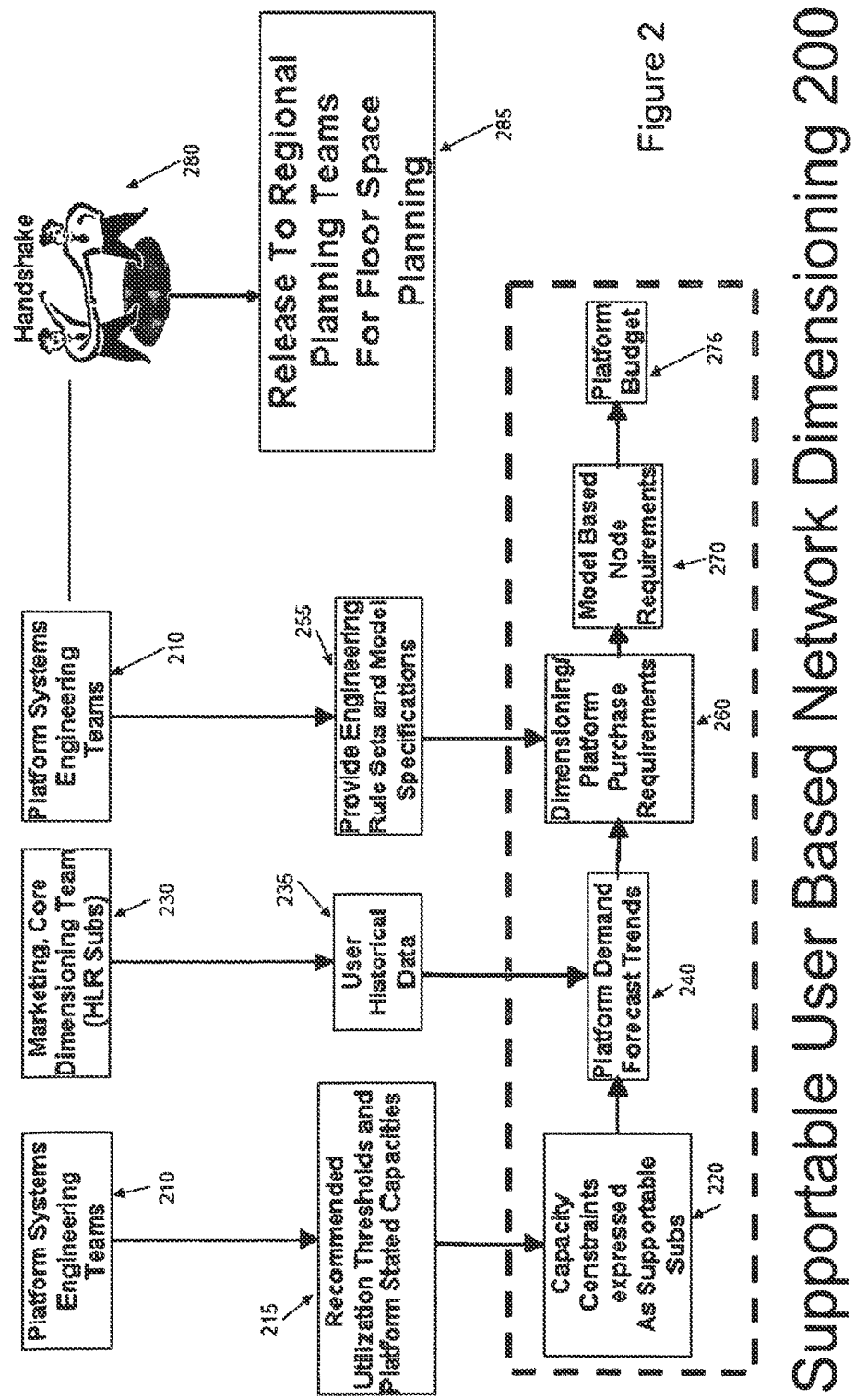
FIG. 2 illustrates another example method according to an example embodiment of the present invention.

FIG. 2 illustrates another example embodiment of the present invention. First, the technical group (e.g., Platform Systems Engineering Teams) 210 decide on or recommend utilization thresholds and capacities (e.g., at 215). For example, the engineering teams may acquire the technical specifications for different pieces of hardware and software, each of which may have a different level of technical resources. The engineering teams may find that utilizations lower than 100% cause greater overall system efficiency and recommend an appropriate utilization threshold. At 220, these capacity constraints and utilization thresholds are expressed as total supportable users. At 230, the business (e.g., non-technical) teams provide historical data about users (e.g., at 235). At 240, this historical data help provides user/platform demand forecast trends. In addition to the utilization thresholds and capacities outlined in 215, the engineering teams may also provide rule sets and model specifications for new or prospective equipment (e.g., at 255). This can be for any number of things, including changes to the legacy systems, additions to the legacy systems, or new model systems to augment, replace, or supplement the legacy systems. These specifications can then be used to determine the purchasing requirements for the user based dimensioning at 260. At 270, the individual network node requirements are determined based on the user based model just assembled, which may result in 275, a platform budget designed to meet the user based forecasting predictions. Once the user based dimensioning results are agreed upon (e.g., at 280), the regional planning teams can plan floor space and other physical infrastructure requirements at 285 for the approved additions.

Figure 3:
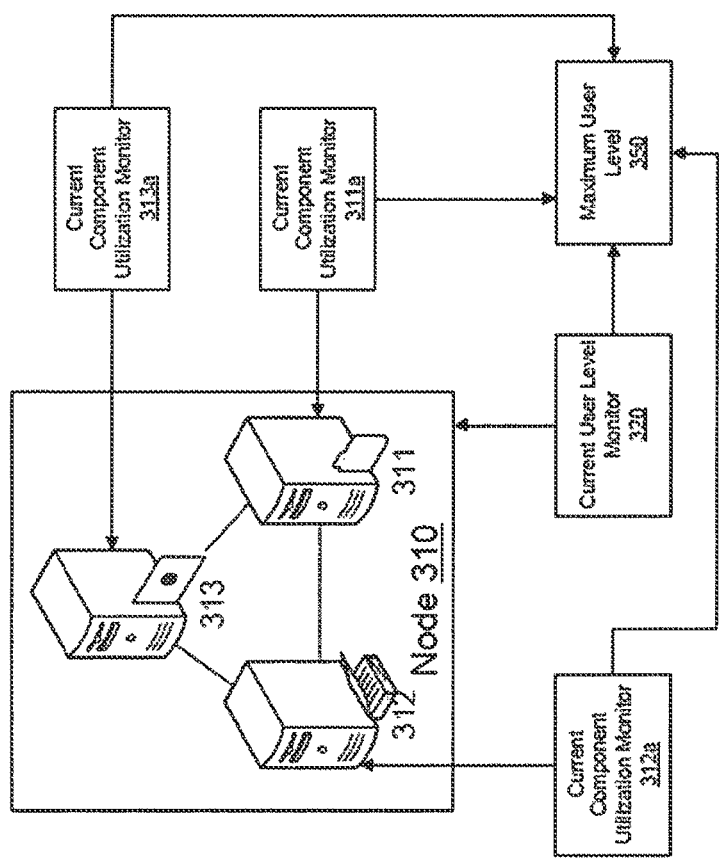
FIG. 3 illustrates an example node system according to an example embodiment of the present invention.

FIG. 3 illustrates an example node according to example embodiments of the present invention. Node 310 includes three components 311, 312, and 313. These components can be servers (e.g., a rack of blade servers) that are jointly responsible for the processing functions of the network node 310, or they can each have a dedicated set of tasks partitioned or partially partitioned from the other tasks on the other servers. There may be more or fewer than three components to each node, and the components themselves may be made of individual entities. Each component can have a current utilization monitor, e.g., 311a, 312a, and 313a. The node can also have a user level monitor 320. The utilization monitors and user level monitor interface with a component 350 configured to calculate a maximum supportable users capacity level based on the data from the other monitors.

FIG. 4 illustrates an example network according to example embodiments of the present invention. For example, network 400 is made up for four nodes, 410, 420, 430, and 440. Each of these nodes can be like the node illustrated in FIG. 3 without the monitor components shown. If, for example, the maximum supportable users capacity level component 350 determined that the maximum number of users that a node could facilitate was 10,000, then, according to an embodiment of the present invention, network 400 could currently support 40,000 users. Connected to the network 400 can be a user forecaster component 490. This forecaster component 490 receives, for example, historical user data 495.

This data may come from within network 400 or may come from an outside source. In an embodiment, the forecaster may use other pieces of data (e.g., the component utilization constraints) in determining estimated future user levels. In an embodiment, when the forecaster component indicates that the level of users will exceed the maximum user capacity, the network (or network administrators) add a preconfigured network node 450, which has a predetermined supportable users capacity associated with it. New node 450 may be the same or different than any of nodes 410, 420, 430, or 440. Additionally, the supportable users associated with node 450 may be determined based on historical data of identical or similar nodes already in operation. In a further or alternative embodiment, the supportable users of new node 450 may be determined by the factory specifications of each of the components that make up node 450.

It will be appreciated that all of the disclosed methods and procedures described herein can be implemented using one or more computer programs or components. These components may be provided as a series of computer instructions on any conventional computer-readable medium, including RAM, ROM, flash memory, magnetic or optical disks, optical memory, or other storage media. The instructions may be configured to be executed by a processor which, when executing the series of computer instructions, performs or facilitates the performance of all or part of the disclosed methods and procedures.

It should be understood that there exist implementations of other variations and modifications of the invention and its various aspects, as may be readily apparent to those of ordinary skill in the art. The scope of the invention is not limited by specific embodiments described herein. Features and embodiments described above may be combined with each other in various combination.

What is claimed is:

1. A method of supportable user based dimensioning, comprising:
    calculating with a processor a total supportable user level capacity and providing the total supportable user level capacity to a forecaster component, the total supportable user level capacity based at least in part on the current user level, current utilization levels of a plurality of constraints and maximum utilization levels of the plurality of constraints;
    providing user historical data to the forecaster component;
    providing rule sets and model specifications for new and/or prospective equipment to the forecaster component;
    forecasting by the forecaster component at least one future user level based at least in part of the total supportable user level, user historical data, and rule sets and model specifications such that purchasing requirements for the user based dimensioning are based on a forecasted analysis of the future user level;
    designing with the processor a platform budget based on the purchasing requirements to meet the future user level; and
    expanding the network resource service including adding sets of hardware, wherein each set has a supportable users metric associated with each respective set which represents an amount the maximum supportable users capacity is expected to increase after each respective set has been added to the network resource service, and wherein the respective sets of hardware configuration and associated number of users is predetermined.

2. The method of claim 1, wherein current utilization levels includes at least one of the following constraints: memory utilization, signal capacity utilization, and processor utilization.

3. The method of claim 2, wherein signaling link utilization includes at least one of: Signaling System Number 7 (SS7), Signaling Transport (SIGTRAN), Stream Control Transmission Protocol (SCTP), and Internet Protocol (IP) protocols.

4. The method of claim 1, wherein a user is a wireless telecommunications customer, and wherein the network resource service includes a wireless communication service provider.

5. The method of claim 1, wherein the rule sets and model specifications include at least one of: changes to legacy systems; additions to legacy systems; and new model systems to augment, replace or supplement legacy systems.

6. The method of claim 1, further comprising calculating node requirements based on the future user level, wherein the designing step further includes the calculated node requirements in the platform budget.

7. The method of claim 1, wherein the plurality of constraints represent a network resource service, and wherein the current user level, current utilization levels of the plurality of constraints and maximum utilization levels of the plurality of constraints of the total supportable user level capacity are determined by the steps comprising:
    calculating with the processor an average supportable user capacity;
    forecasting the at least one future user level based at least in part of the calculated average supportable user capacity; and
    calculating with the processor a growing user forecast and expanding the network resource service, based at least in part on a ratio of the forecasted future user level and the total supportable user level capacity.

8. A method of supportable user based dimensioning, comprising:
    calculating with a processor a total supportable user level capacity and providing the total supportable user level capacity to a forecaster component, the total supportable user level capacity based at least in part on the current user level, current utilization levels of a plurality of constraints and maximum utilization levels of the plurality of constraints;
    providing user historical data to the forecaster component;
    providing rule sets and model specifications for new and/or prospective equipment to the forecaster component;
    analyzing, by the forecaster component, the total supportable user level, user historical data, and rule sets and model specifications to determine at least one future user level such that purchasing requirements for the user based dimensioning are based on a forecasted analysis of the future user level;
    designing with the processor a platform budget based on the purchasing requirements to meet the future user level,
    wherein the purchasing requirements includes sets of hardware for addition such that each set of hardware added is associated with the total supportable user level capacity and the future user level; and
    expanding, based on the platform budget, the network resource service, wherein the expanding includes adding sets of hardware, wherein each set has a supportable users metric associated with each respective set which represents the maximum supportable users capacity is expected to increase after each respective set has been added to the network resource service.

9. The method of claim 8, wherein the respective sets of hardware configuration and associated number of users is predetermined.

10. The method of claim 8, wherein current utilization levels includes at least one of the following constraints: memory utilization, signal capacity utilization, and processor utilization.

11. The method of claim 10, wherein signaling link utilization includes at least one of: Signaling System Number 7 (SS7), Signaling Transport (SIGTRAN), Stream Control Transmission Protocol (SCTP), and Internet Protocol (IP) protocols.

12. The method of claim 8, wherein a user is a wireless telecommunications customer, and wherein the network resource service includes a wireless communication service provider.

13. The method of claim 8, wherein the rule sets and model specifications include at least one of: changes to legacy systems; additions to legacy systems; and new model systems to augment, replace or supplement legacy systems.

14. The method of claim 8, further comprising calculating node requirements based on the future user level, wherein the designing step further includes the calculated node requirements in the platform budget.

* * * * *